2,729,615

MANUFACTURE OF POLYMERISATION PRODUCTS OBTAINED FROM ACRYLIC ACID DERIVATIVES

George Isaac Maurice Bloom, Knebworth, Jack Ernest Duddington, St. Albans, Mervyn Frederick Vincent, Harpenden, and Anthony Horace Willbourn, Welwyn Garden City, England, assignors to Imperial Chemical Industries Limited, London, England, a corporation of Great Britain No Drawing. Application January 21, 1953,
Serial No. 332,512

Claims priority, application Great Britain
February 1, 1952

6 Claims. (Cl. 260—63)

This invention relates to the manufacture of polymerisation products obtained from acrylic acid derivatives and more particularly to the manufacture of polymerisation products obtained from α-chloroacrylic acid esters.

α-Chloroacrylic acid esters may be polymerised under the influence of heat and/or light to yield polymerisation products which are colourless, transparent and of attractive appearance and which have a number of other desirable characteristics including non-inflammability, high softening point, high tensile strength and good resistance to crazing.

The polymerisation products may be produced in the form of sheets by carrying out the polymerisation in a flat chamber having substantially rigid walls separated from each other by one or more elastic, yieldable spacing members. The α-chloroacrylic acid ester is introduced into the chamber in the monomeric form or in the form of a partially polymerised syrup and is then subjected for example to a temperature of between about 35° C. and about 100° C. in the presence of a small amount of a catalyst for a period of several hours. The resulting polymerisation product is usually subjected to a heat treatment.

Sheets of the heat-treated polymerisation product are very suitable for use in glazing applications, e. g. in flat or corrugated roof-lights, and in the windows of aircraft, particularly aircraft having pressurised cabins or adapted to fly at high speeds. It has been found, however, that faults are frequently encountered when such sheets are shaped at temperatures above their softening point owing to the development of a number of small pits or dimples over the surface of the sheet.

The object of the present invention is to provide a process for the manufacture of polymerisation products from α-chloroacrylic acid esters, by which products may be obtained in which the tendency to develop pits or dimples on shaping them at temperatures above their softening point is reduced if not eliminated.

According to the present invention we provide a process which comprises polymerising an ester of α-chloroacrylic acid as hereinafter defined, in the presence of a small quantity of an epoxy compound. The invention also comprises polymeric products produced in this way and shaped articles consisting wholly or in part of such polymeric products.

The esters of α-chloroacrylic acid which may be polymerised according to our invention are methyl, ethyl, propyl and iso-propyl α-chloroacrylates. The ester may be polymerised in the presence of one or more other compounds which are capable of co-polymerising therewith, such as compounds containing the group $CH_2=C<$, e. g. vinyl esters and ethers, vinyl halides, acrylic and methacrylic acids, their amides and esters, acrolein, vinyl ketones, styrene and vinyl naphthalene.

Examples of epoxy compounds include ethylene oxide, propylene oxide, epichlorhydrin, phenyl glycidyl ether, diallyl ether monoxide and poly-diallyl ether monoxide. Other epoxy compounds may be used but it will be appreciated that the epoxy compound used should not be one which inhibits polymerisation.

The amount of epoxy compound required to achieve the optimum effect varies according to the particular epoxy compound used and also varies somewhat from one sample of α-chloroacrylic acid ester to another, depending partly on the source and purity of the sample, but it usually is not in excess of about 0.15% nor less than about 0.01% by weight of the α-chloroacrylic acid ester.

In carrying out the process of the present invention, the epoxy compound may be added to the monomeric α-chloroacrylic acid ester, and the liquid poured into a casting cell and polymerised therein. It is, however, sometimes preferred to partialy polymerise the monomeric α-chloroacrylic acid ester before pouring into the casting cell because there is then less danger of leakage through the joints. Such syrups may be prepared by heating the monomeric material containing the epoxy compound in the presence of a polymerisation catalyst and interrupting the polymerisation before the polymerising material becomes too viscous to pour.

The polymerisation of the monomeric material or partially polymerised syrup may be activated by heat or by irradiation with actinic light or by a combination of both. The polymerisation may also be activated by dissolving polymerisation catalysts in the monomeric material or partially polymerised syrup, for example, organic peroxides, and azo compounds having molecules containing the grouping

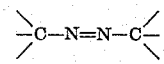

in which the two carbon atoms are both non-aromatic, e. g. αα'-azodiisobutyronitrile, may be used. The polymerisation may be conveniently be carried out at a temperature between about 35° C. and about 100° C. in the presence of a small amount, for example, between 0.005% and 0.03% calculated on the weight of the monomeric material, of polymerisation catalyst.

Light screening agents may be added to the monomer or syrup in order to improve the stability of the polymerisation product to light. Other ancillary ingredients such as plasticisers, fillers and pigments, may also be present during the polymerisation provided these do not react with or colour undesirably the material being polymerised.

The polymerisation product is preferably subjected to a heat-treatment shortly after the polymerisation as this increases its colour stability and its resistance to crasing. This may be effected by heating the polymerisation product to a temperature of from about 100 to about 140° C. for a period of from 24 to 12 hours.

Our invention is illustrated, but not limited, by the following example in which all parts are by weight.

Example

To 100 parts of methyl α-chloroacrylate were added 0.10 part of propylene oxide and 0.007 part of αα'-azodiisobutyronitrile. When solution was complete the mixture was evacuated to remove dissolved air and poured into a casting cell. The casting cell consisted of two glass plates separated by a gasket consisting of polyvinyl alcohol tubing arranged around the edge portions of the glass plates and was rendered fluid-tight by pressing the glass plates against the gasket by means of screw clamps. The casting cell and contents were heated to 45° C. for 16 hours after which polymerisation was substantially complete.

The casting cell and contents were then heat treated at 120° C. for 24 hours and the polymer removed from the casting cell after cooling to 90° C. under water. A clear, colourless sheet of polymer was obtained which remained substantially free of pits or dimples after shaping at 160–175° C.

A sheet of polymer prepared in the same way but without the addition of propylene oxide developed a large number of pits or dimples on shaping at 160–175° C.

Another sample of polymer prepared similarly but in presence of 0.10 part of ethylene oxide in place of the propylene oxide also remained substantially free from pits or dimples on shaping at 160–175° C.

We claim:

1. A process which comprises polymerizing an ester of alpha-chloroacrylic acid in the presence of a compound containing an epoxy group selected from the group consisting of ethylene oxide, propylene oxide, epichlorohydrin, phenyl glycidyl ether, diallyl ether monoxide and poly-diallyl ether monoxide.

2. A process according to claim 1 in which the compound containing an epoxy group is propylene oxide.

3. A process according to claim 1 in which the compound containing an epoxy group is ethylene oxide.

4. A process according to claim 1 in which the ester of alpha-chloroacrylic acid is the methyl ester.

5. A process according to claim 1 wherein the ester of alpha-chloroacrylic acid is copolymerized with at least one ethylenically unsaturated compound.

6. A process which comprises polymerizing an ester of alpha-chloroacrylic acid in the presence of from 0.01 to 0.15% by weight of the alpha-chloroacrylic acid ester, a compound containing an epoxy group selected from the group consisting of ethylene oxide, propylene oxide, epichlorohydrin, phenyl glycidyl ether, diallyl ether monoxide and poly-diallyl ether monoxide.

References Cited in the file of this patent

UNITED STATES PATENTS

| | | |
|---|---|---|
| 1,988,529 | Werntz | Jan. 22, 1935 |
| 2,524,432 | Dorough | Oct. 3, 1950 |
| 2,576,821 | Barnes | Nov. 27, 1951 |